(12) United States Patent
Jiménez

(10) Patent No.: US 11,438,447 B2
(45) Date of Patent: Sep. 6, 2022

(54) FIRST NODE, COMMUNICATION DEVICE, AND METHODS PERFORMED THEREBY FOR HANDLING POSITIONING INFORMATION

(71) Applicant: Telefonaktiebolaget LM Ericsson (publ), Stockholm (SE)

(72) Inventor: Jaime Jiménez, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/255,506

(22) PCT Filed: Jul. 3, 2018

(86) PCT No.: PCT/EP2018/067987
§ 371 (c)(1),
(2) Date: Dec. 23, 2020

(87) PCT Pub. No.: WO2020/007455
PCT Pub. Date: Jan. 9, 2020

(65) Prior Publication Data
US 2021/0274024 A1 Sep. 2, 2021

(51) Int. Cl.
*H04L 69/24* (2022.01)
*H04W 4/70* (2018.01)
(Continued)

(52) U.S. Cl.
CPC ............ *H04L 69/24* (2013.01); *H04L 67/04* (2013.01); *H04L 67/12* (2013.01); *H04L 67/18* (2013.01);
(Continued)

(58) Field of Classification Search
CPC ......... H04L 69/24; H04L 67/04; H04L 67/12; H04L 67/18; H04L 67/2823; H04W 4/70; H04W 4/02; H04W 4/18
See application file for complete search history.

(56) References Cited

U.S. PATENT DOCUMENTS 10,154,371 B1\* 12/2018 Rahat ...................... H04W 4/02
10,375,530 B2\* 8/2019 Buckley .............. H04L 65/4076
(Continued)

FOREIGN PATENT DOCUMENTS

EP     3306959 A1    4/2018
WO   2018035431 A1    2/2018

OTHER PUBLICATIONS

Open Mobile Alliance, "Lightweight Machine to Machine Technical Specification", Version 1.0.1, Jul. 4, 2017, pp. 1-141, OMA-TS-LightweightM2M-V1_0_1-20170704-A, OMA.
(Continued)

*Primary Examiner* — Blake J Rubin
(74) *Attorney, Agent, or Firm* — Coats & Bennett, PLLC

(57) ABSTRACT

A method performed by a first node (111) is described herein. The first node (111) operates in a communications network (10). The first node (111) sends (204) a query to a second node (112) operating in the communications network (10). The query requests information on a location of a communication device (130) operating in the communications network (10). The communication device (130) is identified by the first node (111) as a constrained communication device (130) lacking a capability to query the second node (112). The first node (111) obtains (205) the information from the second node (112), in response to the sent query, and initiates updating (207) an object in the communication device (130) based on the obtained information. A method performed by the communication device
(Continued)

(130) is also described, whereby the device sends (301), to the first node (111), an indication that it is constrained, and obtains (304) the update.

18 Claims, 8 Drawing Sheets

(51) Int. Cl.
| | | |
|---|---|---|
| *H04L 67/04* | (2022.01) | |
| *H04L 67/12* | (2022.01) | |
| *H04L 67/52* | (2022.01) | |
| *H04W 4/02* | (2018.01) | |
| *H04W 4/18* | (2009.01) | |
| *H04L 67/565* | (2022.01) | |

(52) U.S. Cl.
CPC .............. *H04W 4/02* (2013.01); *H04W 4/18* (2013.01); *H04W 4/70* (2018.02); *H04L 67/2823* (2013.01)

(56) References Cited

U.S. PATENT DOCUMENTS

| | | | | |
|---|---|---|---|---|
| 10,742,744 | B1* | 8/2020 | Mahalank | H04L 67/16 |
| 10,992,552 | B2* | 4/2021 | Li | H04L 67/12 |
| 11,316,932 | B2* | 4/2022 | Smith | H04L 41/0806 |
| 2016/0100362 | A1* | 4/2016 | Palanisamy | H04W 52/0229 370/311 |
| 2016/0112981 | A1 | 4/2016 | Ahn et al. | |
| 2016/0226828 | A1* | 8/2016 | Bone | G06F 21/71 |
| 2017/0238129 | A1* | 8/2017 | Maier | H04W 4/029 455/404.2 |
| 2017/0245240 | A1* | 8/2017 | Kim | H04W 48/16 |
| 2017/0295503 | A1* | 10/2017 | Govindaraju | H04L 69/22 |
| 2018/0034913 | A1* | 2/2018 | Matthieu | H04L 67/18 |
| 2018/0054796 | A1* | 2/2018 | Edge | H04W 4/029 |
| 2018/0324671 | A1* | 11/2018 | Palnati | H04L 63/20 |
| 2018/0332434 | A1* | 11/2018 | Kulkarni | H04L 43/10 |
| 2019/0007807 | A1* | 1/2019 | Hassan | H04W 4/90 |
| 2019/0021039 | A1* | 1/2019 | Sudarsan | H04L 45/42 |
| 2019/0042378 | A1* | 2/2019 | Wouhaybi | H04L 69/40 |
| 2019/0069221 | A1* | 2/2019 | Virgile | H04W 88/16 |
| 2019/0132236 | A1* | 5/2019 | Rahman | H04L 45/16 |
| 2019/0138294 | A1* | 5/2019 | Smith | G06F 21/44 |
| 2019/0213640 | A1* | 7/2019 | Buchman | H04L 67/306 |
| 2019/0297570 | A1* | 9/2019 | Bharadwaj | H04Q 9/00 |
| 2019/0306251 | A1* | 10/2019 | Talebi Fard | H04L 67/12 |
| 2020/0037226 | A1* | 1/2020 | Magadevan | H04W 4/80 |
| 2020/0146077 | A1* | 5/2020 | Li | H04W 76/10 |
| 2020/0374700 | A1* | 11/2020 | Smith | H04L 9/3247 |
| 2020/0413280 | A1* | 12/2020 | Chang | G16Y 40/20 |
| 2021/0211509 | A1* | 7/2021 | Ly | H04L 67/16 |

OTHER PUBLICATIONS

Shelby, Z. et al., "The Constrained Application Protocol (CoAP)", Internet Engineering Task Force (IETF), Jun. 1, 2014, pp. 1-112, RFC 7252, IETF.

3rd Generation Partnership Project, "3rd Generation Partnership Project; Technical Specification Group Core Network and Terminals; T8 Reference Point for Northbound APIs (Release 15)", Technical Specification, 3GPP TS 29.122 V0.5.0, Jan. 1, 2018, pp. 1-142, 3GPP.

* cited by examiner

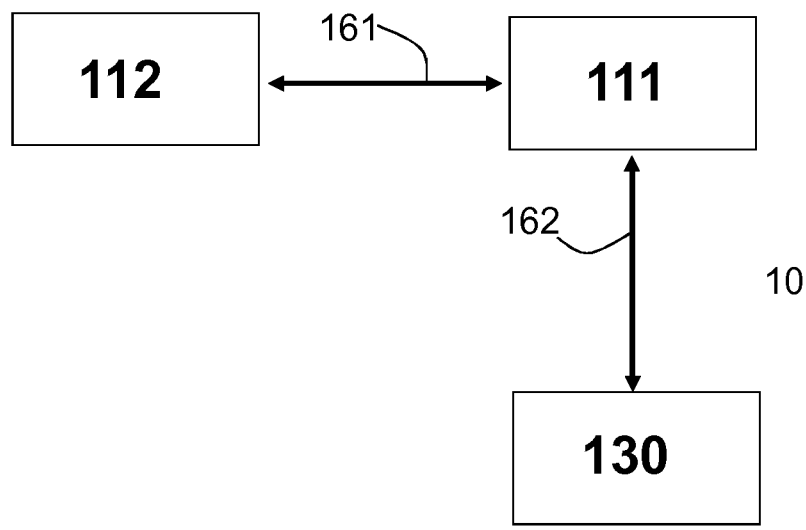
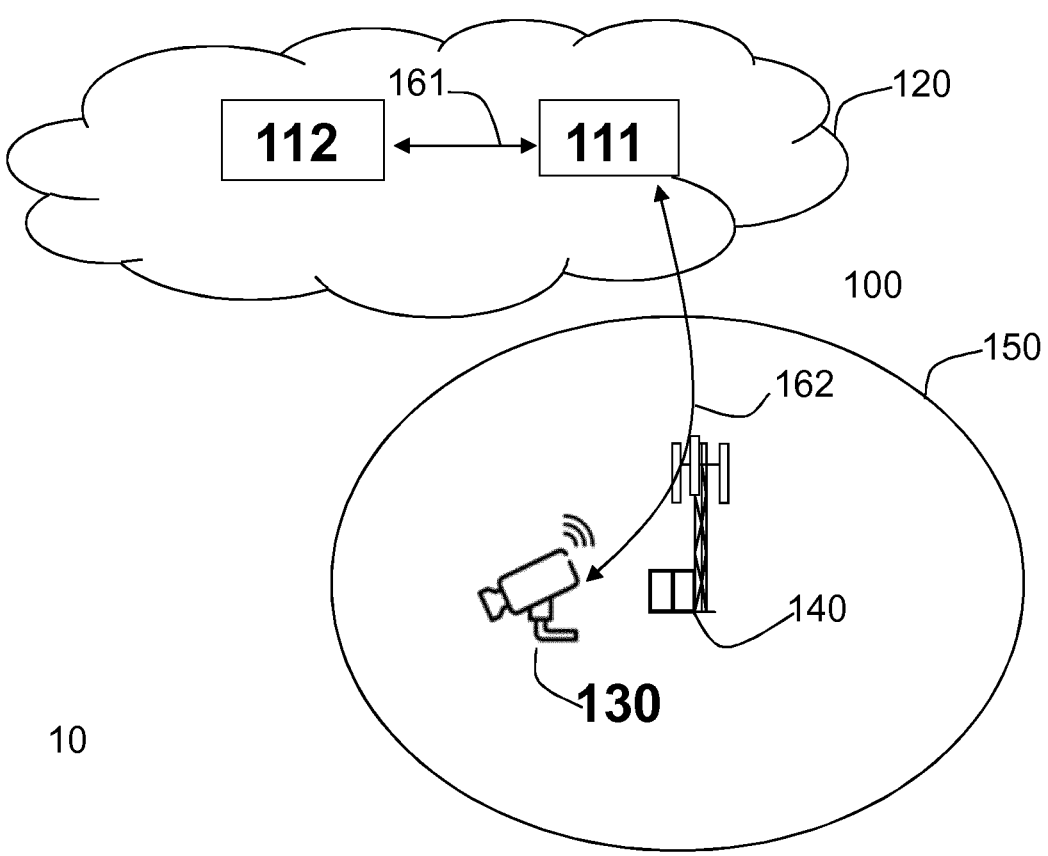
Figure 1 ageOflocationInfo - Indicates the elapsed time since the last network contact of the UE.
cellId - Indicates the Cell Global Identification of the user identifying the cell the UE is registered.
enodeBid - Indicates the eNodeB in which the UE is currently located.
geographicArea - Identifies geographic information about the UE
latitude - Indicates the latitude value
locationAreaId - Identifies the Location Area Identity of the user where the UE is located.
longitude - Indicates the longitude value
routingAreaId - Identifies the Routing Area Identity of the user where the UE is located.
serviceAreaId - Identifies the Service Area Identity of the user where the UE is located.
trackingAreaId - Identifies the Tracking Area Identity of the user where the UE is located.

Figure 6 a)
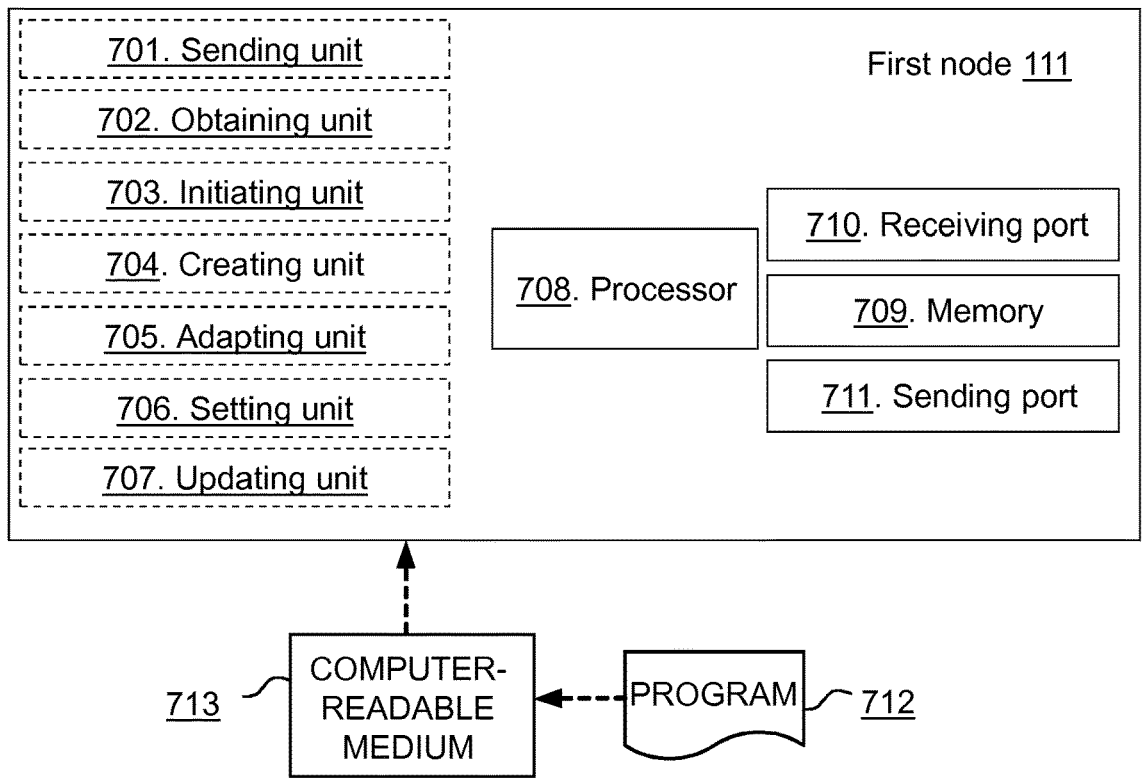
b)
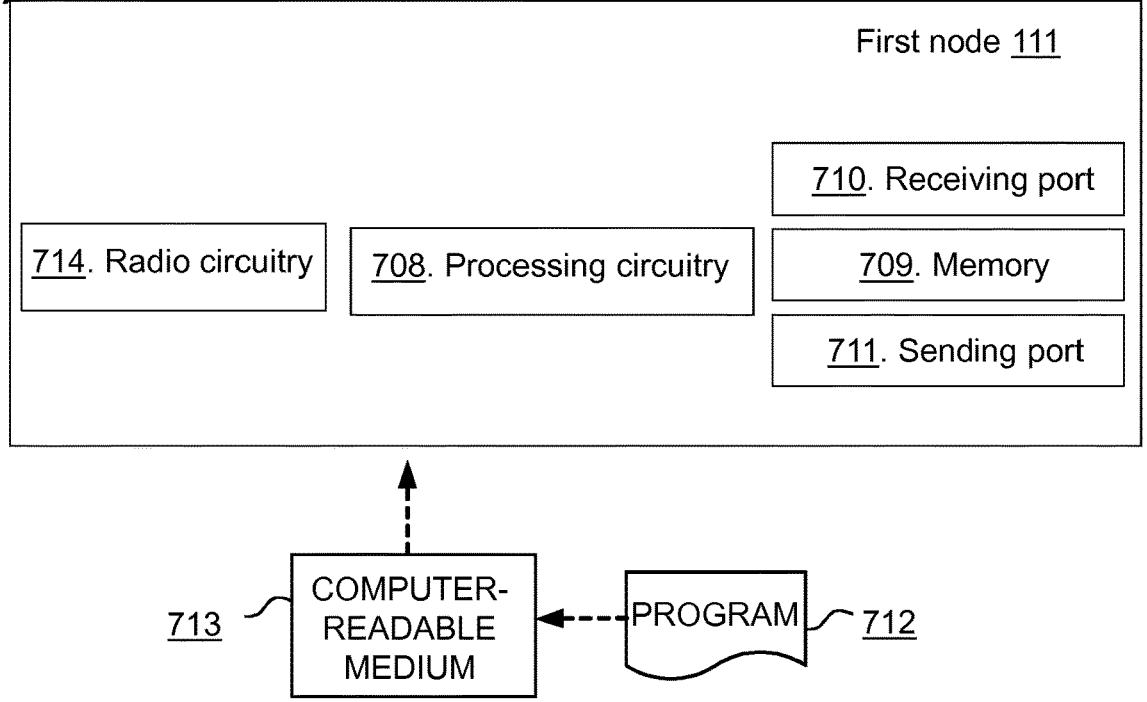
Figure 7 a)
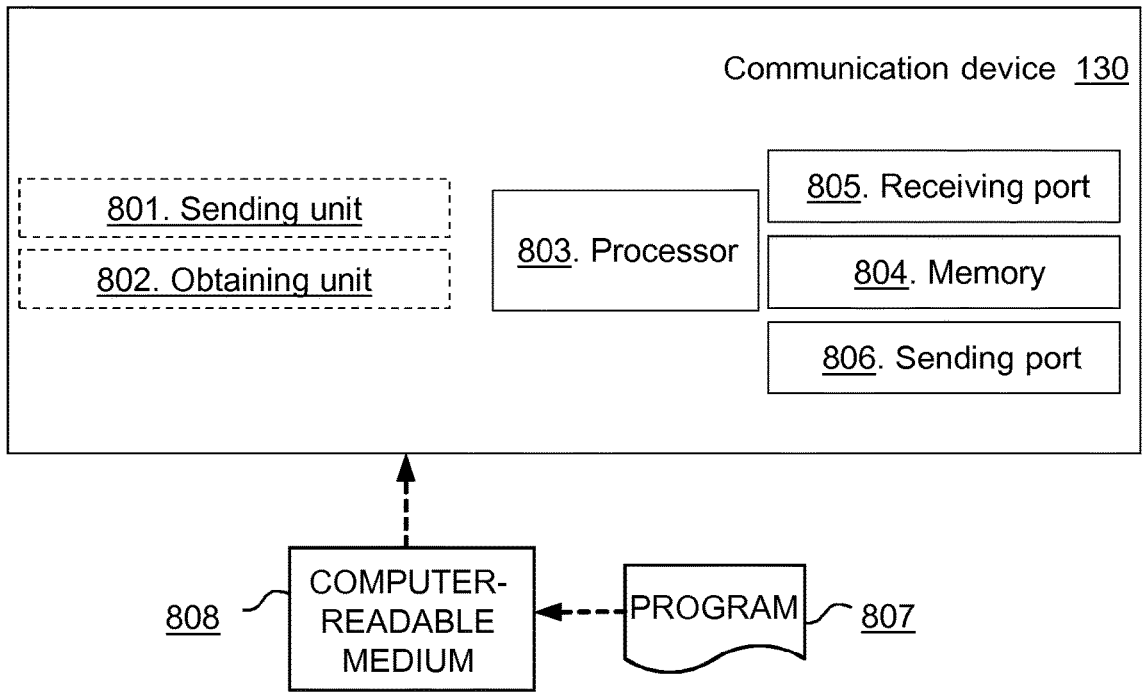
b)
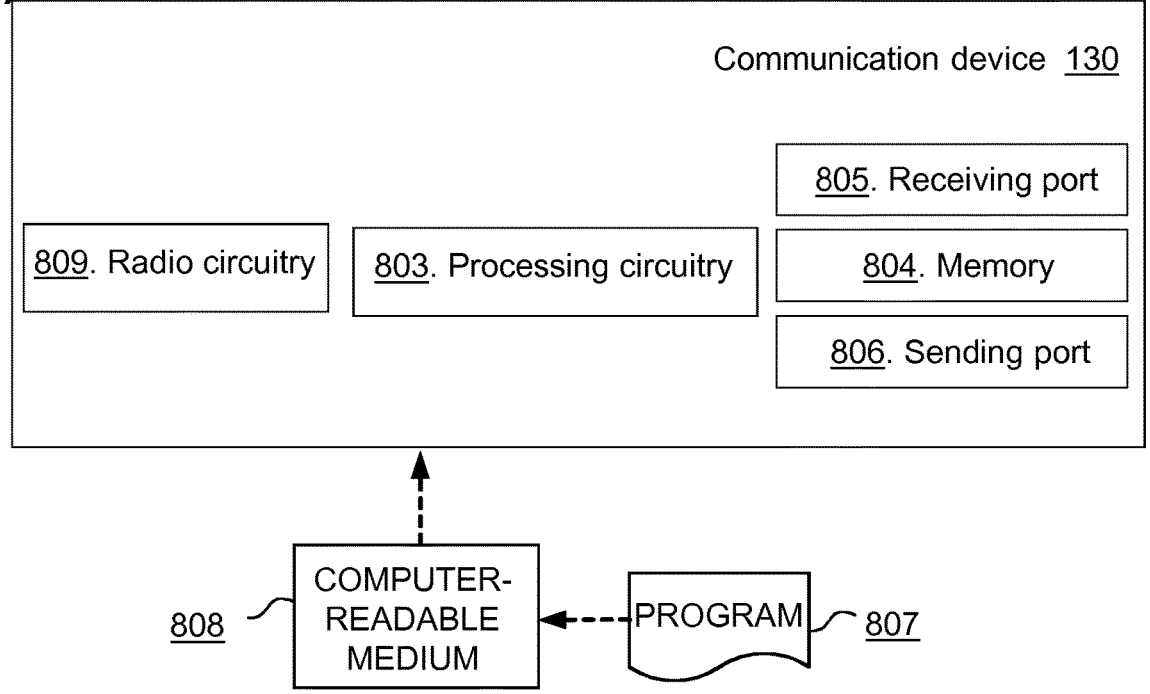
Figure 8

FIRST NODE, COMMUNICATION DEVICE, AND METHODS PERFORMED THEREBY FOR HANDLING POSITIONING INFORMATION

TECHNICAL FIELD

The present disclosure relates generally to a first node and methods performed thereby for handling positioning information. The present disclosure also relates generally to a communications device, and methods performed thereby for supporting handling positioning information. The present disclosure further relates generally to a computer program product, comprising instructions to carry out the actions described herein, as performed by the first node, or the communication device. The computer program product may be stored on a computer-readable storage medium.

BACKGROUND

Computer systems may comprise one or more nodes. A node may comprise one or more processors which, together with computer program code may perform different functions and actions, a memory, a receiving and a sending port. A node may be, for example, a server. Nodes may be comprised in a communications network.

Nodes within a communications network may be wireless devices, e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the telecommunications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The communications network may cover a geographical area which may be divided into cell areas, each cell area being served by another type of node, a network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies.

In 3rd Generation Partnership Project (3GPP) Long Term Evolution (LTE), base stations, which may be referred to as eNodeBs or even eNBs, may be directly connected to one or more core networks. All data transmission in LTE is controlled by the radio base station.

The standardization organization 3GPP is currently in the process of specifying a New Radio Interface called NR or 5G-UTRA, as well as a Fifth Generation (5G) Packet Core Network, which may be referred to as Next Generation Core Network, abbreviated as NG-CN, NGC or 5G CN.

Internet of Things (IoT)

The Internet of Things (IoT) may be understood as an internetworking of communication devices, e.g., physical devices, vehicles, which may also referred to as "connected devices" and "smart devices", buildings and other items—embedded with electronics, software, sensors, actuators, and network connectivity that may enable these objects to collect and exchange data. The IoT may allow objects to be sensed and/or controlled remotely across an existing network infrastructure.

"Things," in the IoT sense, may refer to a wide variety of devices such as heart monitoring implants, biochip transponders on farm animals, electric clams in coastal waters, automobiles with built-in sensors, DNA analysis devices for environmental/food/pathogen monitoring, or field operation devices that may assist firefighters in search and rescue operations, home automation devices such as the control and automation of lighting, heating, e.g. a "smart" thermostat, ventilation, air conditioning, and appliances such as washer, dryers, ovens, refrigerators or freezers that may use WiFi for remote monitoring. These devices may collect data with the help of various existing technologies and then autonomously flow the data between other devices.

Machine Type Communication (MTC)

Machine Type Communication (MTC) has, especially in the context of the Internet of Things (IoT), shown to be a growing market segment. An MTC device may be a communication device, typically a wireless communication device or simply wireless device, that is a self and/or automatically controlled unattended machine and that is typically not associated with an active human user in order to generate data traffic. An MTC device may be typically more simple, and typically associated with a more specific application or purpose, than, and in contrast to, a conventional mobile phone or smart phone.

MTC involves communication in a wireless communication network to and/or from MTC devices, in which communication typically may be of quite different nature and with other requirements than communication associated with e.g. conventional mobile phones and smart phones. In the context of the IoT it is evident that MTC traffic will be increasing and thus needs to be increasingly supported in wireless communication systems.

Constrained Application Protocol (CoAP)

Some of the devices that may make use of IoT or MTC may be considered constrained devices. A constrained device or constrained node may be understood as a node where some of the characteristics of Internet nodes may not be attainable, often due to cost constraints and/or physical constraints on characteristics such as size, weight, and available power and energy. For example, a constrained device may be a sensor in a car or in a building.

The Constrained Application Protocol (CoAP) may be understood as a generic Representational State Transfer (REST) application Protocol for constrained devices. It may be understood as defined in RFC7252. CoAP may be considered to enable constrained devices to communicate with the wider Internet using similar protocols. CoAP is designed to be used over User Datagram Protocol (UDP), which is described in RFC0768, over the Internet.

On actual deployments of CoAP, variants like Lightweight Machine to Machine Protocol (LWM2M) are becoming increasingly popular in order to manage devices in a RESTful fashion.

LWM2M may be understood to provide a simple mechanism for device management of IoT Devices. It may provide interfaces for Information Reporting, Service Enablement, Firmware Updates and a generic way to securely manage a device.

In existing methods, the functionality of constrained devices is rather basic, given the limited capabilities of these devices. For example, most constrained devices lack positioning functionality. Therefore, factoring positioning information into the management functions of these devices is not possible.

SUMMARY

It is an object of embodiments herein to improve the communication of constrained devices in a communications network. It is a particular object of embodiments herein to enable the provision of location services to constrained devices lacking positioning capability.

According to a first aspect of embodiments herein, the object is achieved by a method performed by a first node. The first node operates in a communications network. The first node sends a query to a second node. The second node operates in the communications network. The query requests information on the location of the communication device. The communication device operates in the communications network. The communication device is identified by the first node as a constrained communication device lacking a capability to query the second node. The first node obtains the information from the second node, in response to the sent query. The first node initiates updating an object in the communication device based on the obtained information.

According to a second aspect of embodiments herein, the object is achieved by a method performed by a communication device. The communication device operates in the communications network. The communication device is a constrained communication device. The communication device sends, to the first node operating in the communications network, the indication that the communication device is a constrained communication device. The communication device obtains, from the first node and based on to the sent indication, the update in the object in the communication device. The update comprises the information on the location of the communication device. The communication device lacks the capability to query the second node. The second node operates in the communications network and has access to the location information. The information in the obtained update originates in the second node.

According to a third aspect of embodiments herein, the object is achieved by the first node, configured to operate in the communications network. The first node is further configured to send the query to the second node. The second node is configured to operate in the communications network. The query is configured to request the information on the location of the communication device. The communication device is configured to operate in the communications network. The communication device is configured to be identified by the first node as a constrained communication device lacking the capability to query the second node. The first node is further configured to obtain the information from the second node, in response to the query configured to be sent. The first node is further configured to initiate updating the object in the communication device based on the information configured to be obtained.

According to a fourth aspect of embodiments herein, the object is achieved by the communication device, configured to operate in the communications network. The communication device is a constrained communication device. The communication device is further configured to send, to the first node configured to operate in the communications network, the indication that the communication device is a constrained communication device. The communication device is also configured to obtain, from the first node and based on to the indication configured to be sent, the update in the object in the communication device. The update is configured to comprise the information on the location of the communication device. The communication device lacks the capability to query the second node. The second node is configured to operate in the communications network and is also configured to have access to the location information. The information in the update configured to be obtained is configured to originate in the second node.

According to a fifth aspect of embodiments herein, the object is achieved by a computer program, comprising instructions which, when executed on at least one processor, cause the at least one processor to carry out the method performed by the wireless device.

According to a sixth aspect of embodiments herein, the object is achieved by a computer-readable storage medium, having stored thereon the computer program, comprising instructions which, when executed on at least one processor, cause the at least one processor to carry out the method performed by the wireless device.

According to a seventh aspect of embodiments herein, the object is achieved by a computer program, comprising instructions which, when executed on at least one processor, cause the at least one processor to carry out the method performed by the network node.

According to an eighth aspect of embodiments herein, the object is achieved by a computer-readable storage medium, having stored thereon the computer program, comprising instructions which, when executed on at least one processor, cause the at least one processor to carry out the method performed by the network node.

By the first node sending the query to the second node on the location of the communication device, the communication device, in spite of being a constrained communication device lacking the capability to query the second node, is enabled to obtain the information on its location. Therefore, location information is provided to communication devices in scenarios, e.g., IoT scenarios, where obtaining location information by constrained communication devices is not supported.

BRIEF DESCRIPTION OF THE DRAWINGS

Examples of embodiments herein are described in more detail with reference to the accompanying drawings, according to the following description.

FIG. 1 is a schematic diagram illustrating two non-limiting examples in a) and b), respectively, of a communications network, according to embodiments herein.

FIG. 6 is a flowchart depicting embodiments of a Topology Diagram, according to embodiments herein.

FIG. 7 is a schematic block diagram illustrating two non-limiting examples, a) and b), of a first node, according to embodiments herein.

FIG. 8 is a schematic block diagram illustrating two non-limiting examples, a) and b), of communication device, according to embodiments herein.

DETAILED DESCRIPTION

Figure 2:
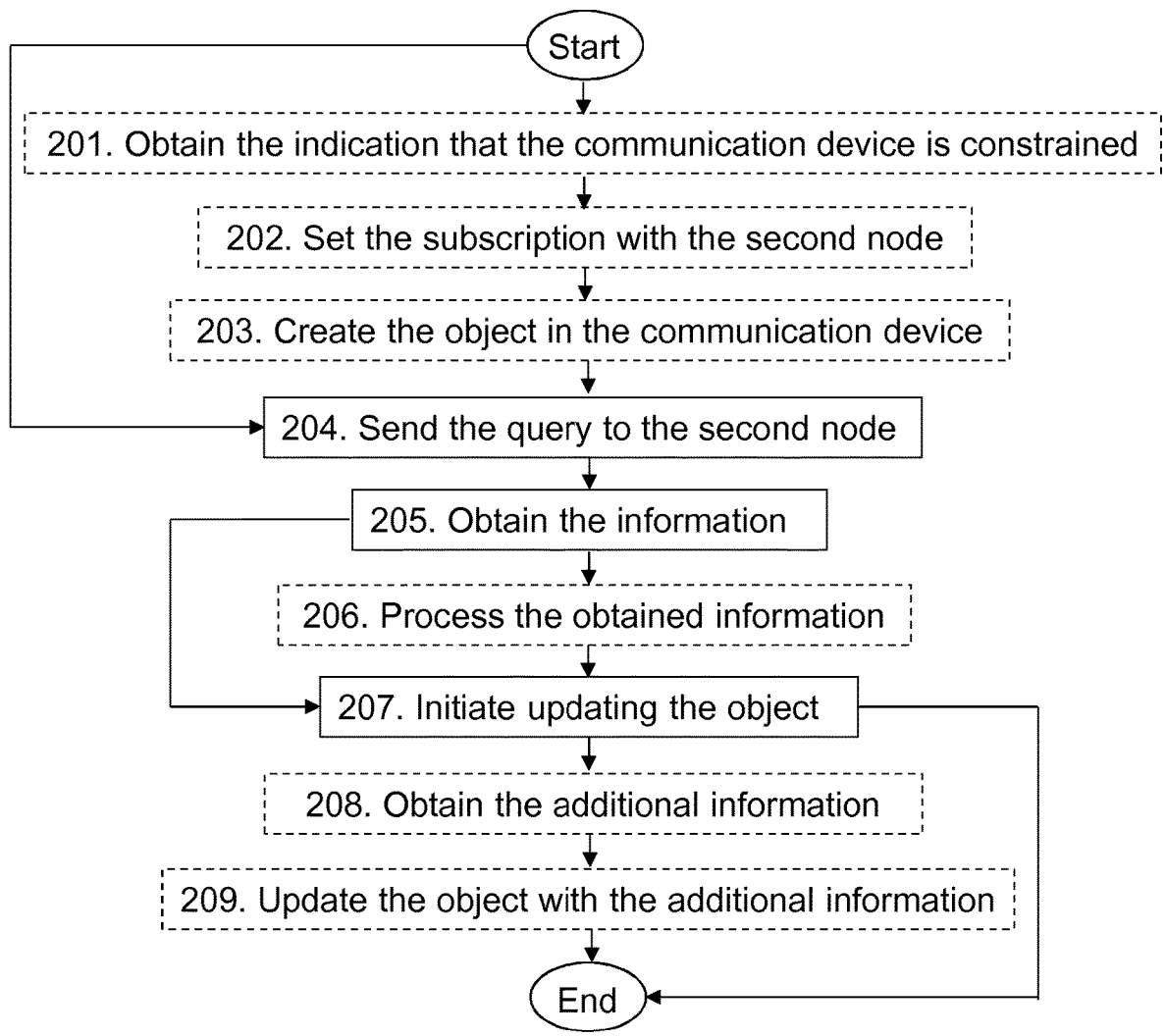
FIG. 2 is a flowchart depicting embodiments of a method in a first node, according to embodiments herein.

As part of the development of embodiments herein, a problem with exiting methods will first be identified and discussed.

As explained earlier, in existing methods, the functionality of constrained devices to is rather basic, given the limited capabilities of these devices. In particular, services that are not accessible to constrained devices are location services, as these devices usually lack means of location, such as Global Positioning System (GPS).

Locations services may be obtained through a 3GPP network. In general, the services provided by a 3GPP network to 3rd party application servers may be securely exposed via a Service Capability Exposure Function (SCEF). The SCEF may be understood to provide a means to access, such as a REST Application Programming Interface (API), to information about UEs that may be normally found in a network of an operator, e.g., location, mobility, etc. The 3GPP organization provides a specification for northbound APIs that expose UE information, such as relative location, radio properties, roaming, mobility, etc. . . . through well-known Hypertext Transfer Protocol (HTTP) APIs. The T8 APIs define the interaction between Application Servers (AS) exposing the API, that is, services interested in the SCEF data, and the SCEF, which may store the information.

Several embodiments are comprised herein, which address the limitations of the existing methods. As an overview, embodiments herein may be understood to be drawn to providing access to location services to constrained devices, which lack such capability. In general, embodiments herein may be understood as relating to SCEF location services over LWM2M. In particular, embodiments herein may be understood to address how an LWM2M Server may interface with the SCEF in a network, and fetch the location of a device that lacks location capabilities, pushing it afterwards to the device.

Embodiments herein are related to an internal implementation document providing for energy efficient accurate positioning methods. Such methods are related to optimizing GPS positioning to save battery. However, they do not use SCEF or the T8 interface. Embodiments herein complement the previous internal implementation document with the interfaces and LWM2M mechanisms that may be needed.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments.

FIG. 1 depicts two non-limiting examples, in panels "a" and "b", respectively, of a communications network 10, in which embodiments herein may be implemented. In some example implementations, such as that depicted in the non-limiting example of FIG. 1a), the communications network 10 may be a computer network. In other example implementations, such as that depicted in the non-limiting example of FIG. 1b), the communications network 10 may be implemented in a telecommunications network 100, sometimes also referred to as a cellular radio system, cellular network or wireless communications system. In some examples, the telecommunications network 100 may comprise network nodes which may serve receiving nodes, such as wireless devices, with serving beams.

The telecommunications network 100 may for example be a Narrow-Band IoT (NB-IoT) network, a Category M1 (CATM) network, a Global System for Mobile communications (GSM) network, or another Internet service provider (ISP)-oriented network that may support an SCEF.

In some examples, the telecommunications network 100 may for example be a network such as 5G system, or Next Gen network. The telecommunications network 100 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system.

The communications network 10 comprises a plurality of nodes, whereof a first node 111, and a second node 112 are depicted in FIG. 1. Each of the first node 111, and the second node 112 may be understood, respectively, as a first computer system, and a second computer system. The first node 111 may be understood as a server lacking positioning functionality itself, but yet able to communicate with the second node 112, which may be understood to have positioning functionality. To have positioning functionality may be understood herein as having the capability to derive and provide positioning information relating to a node or a communication device in the communications network 10. The first node 111 may be further understood to have a capability to communicate with communication devices being constrained devices. In typical examples, the first node 111 may be a LightWeight Machine to Machine protocol (LWM2M) server. The second node 112 may be understood to lack the capability to communicate with communication devices being constrained devices. In some typical examples, the second node 112 may operate a Service Capability Exposure Function (SCEF). In some examples, the second node 112 may support operation on the DNS protocol. In some examples, the first node 112 may support operation on the CoAP and on the DNS protocol.

In some examples, any of the first node 111 and the second node 112 may be implemented, as depicted in the non-limiting example of FIGS. 1a) and 1b), as a standalone server in e.g., a host computer in the cloud 120. Any of the first node 111, and the second node 112 may in some examples be a distributed node or distributed server, with some of their respective functions being implemented locally, e.g., by a client manager, and some of its functions implemented in the cloud 120, by e.g., a server manager. Yet in other examples, any of the first node 111 and the second node 112 may also be implemented as processing resources in a server farm. Any of the first node 111 and the second node 112 may be under the ownership or control of a service provider, or may be operated by the service provider or on behalf of the service provider.

The communications network 10 comprises a communication device 130, as depicted in the non-limiting example scenario of FIG. 1. The communications network 10 may also comprise other communication devices. The communication device 130 may be a UE or a Customer Premises Equipment (CPE) which may be understood to be enabled to communicate data, with another entity, such as a server, a laptop, a Machine-to-Machine (M2M) device, device equipped with a wireless interface, or any other radio network unit capable of communicating over a wired or radio link in a communications system such as the communications network 10. In some embodiments, the communication device 130 may be understood to be a constrained device in e.g., an IoT network. In some particular embodiments, the communication device 130 may be understood to be a constrained device operating on LWM2M. The communication device 130 may run a client application, which may be enabled to communicate with a host application run by the first node 111. The communication device 130 may be understood to lack a capability to directly query the second node 112. For example, the communication device 130 may support operation on CoAP, and may be incapable of supporting operation on the DNS protocol. Incapable of supporting may be understood as lacking support, or not being configured to support, for example.

The communication device 130 may be a wireless device comprised in the communications network 10, such as a Bluetooth Low Energy (BLE) User Equipment (UE). The communication device 130 may be enabled to communicate wirelessly in the communications network 10 and, in some particular examples, may be able support beamforming transmission. The communication may be performed e.g., via a RAN and possibly one or more core networks, comprised within the communications network 10.

The communication device 130 may be also e.g., a mobile terminal, wireless terminal and/or mobile station, mobile telephone, cellular telephone, or laptop, just to mention some further examples. The communication device 130 may be, for example, portable, pocket-storable, hand-held, computer-comprised, a sensor, camera, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles or any other radio network unit capable of communicating over a wired or radio link in the communications network 10.

The telecommunications network 100 may cover a geographical area which, which in some embodiments may be divided into cell areas, wherein each cell area may be served by a radio network node 140, although, one radio network node may serve one or several cells. In the example of FIG. 1b, the radio network node 140 serves a cell 150. The radio network node 140 may be e.g., a gNodeB. That is, a transmission point such as a radio base station, for example an eNodeB, or a Home Node B, a Home eNode B or any other network node capable to serve a wireless device, such as a user equipment or a machine type node in the communications network 10. The radio network node 140 may be of different classes, such as, e.g., macro eNodeB, home eNodeB or pico base station, based on transmission power and thereby also cell size. In some examples, the radio network node may serve receiving nodes with serving beams. The radio network node 140 may support one or several communication technologies, and its name may depend on the technology and terminology used. Any of the radio network nodes that may be comprised in the communications network 10 may be directly connected to one or more core networks.

The first node 111 is configured to communicate within the communications network 10 with the second node 112 over a first link 161, e.g., a radio link, an infrared link, or a wired link. The first link 161 may be understood to be comprised of a plurality of individual links. The first node 111 is configured to communicate within the communications network 10 with the communication device 120 over a second link 162, e.g., a radio link, an infrared link, or a wired link. The second link 162 may be understood to be comprised of a plurality of individual links.

Any of the first link 161 and the second link 162 may be a direct link or it may go via one or more computer systems or one or more core networks in the communications network 10, which are not depicted in FIG. 1, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 1.

In general, the usage of "first", "second", etc. herein may be understood to be an arbitrary way to denote different elements or entities, and may be understood to not confer a cumulative or chronological character to the nouns they modify.

Embodiments of method performed by the first node 111 will now be described with reference to the flowchart depicted in FIG. 2. The method may be understood to be for handling positioning information. The first node 111 operates in the communications network 10. As mentioned earlier, in some embodiments, the first node 111 may be a LightWeight Machine to Machine protocol (LWM2M) server. The first node 111 may run a host application capable of sharing its resources with a client application run by the communication device 130.

The method may comprise the actions described below. Several embodiments are comprised herein. In some embodiments some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 2, optional actions are indicated with dashed boxes.

Action 201

In the course of operations of the communications network 10 the first node 111 may, in this Action 201, obtain, from the communication device 130, an indication that the communication device 130 is a constrained communication device 130. In some embodiments, the communication device 130 may be a constrained device operating on LWM2M. The indication may then indicate that the communication device 130 is a constrained device operating on LWM2M. The indication may be, for example, a common device identifier, such as a Uniform Resource Name (URN), Uniform Resource Identifier (URI), an International Mobile Equipment Identity (IMEI), or some identity derived from key material, of the communications device 130. In some examples, the first node 111 may obtain the indication during the course of a Bootstrapping and Registration procedures, as e.g., specified by the Open Mobile Alliance Device Management (OMA DM)-LWM2M. The Bootstrapping procedure may be understood to be used to onboard an IoT device into a management system, providing key material that may be necessary to establish a secure channel. The registration procedure may be understood to allow the manager to know which are the properties of the device, the measurements it may be able take, when it may be able to take them, etc. These procedures will be briefly described later.

The obtaining, e.g., receiving, in this Action 201 may be performed, e.g., via the second link 162.

In some embodiments, the first node 111 may further obtain, from the communication device 130, either as a part of this Action 201, or as a separate Action, a query, e.g., a first query, information on the location of the communication device 130, that is, the positioning information.

Action 202

To be able to receive notifications, publications, of changes, etc. . . . in some embodiments, the first node 111 may, in this Action 202, set a subscription with the second node 112 for the communication device 130. The second node 112 may be understood to operate in the communications network 10, and may operate a Service Capability Exposure Function (SCEF). To set a subscription may be understood as a procedure to allow the first node 111 to to receive notifications, publications, of changes, etc. . . . . For example, in CoAP, the procedure is described in RFC7641.

In some embodiments, the first node 111 may set the subscription based on having received the first query from the communication device 130.

Action 203

In some examples, based on identifying that the communication device 130 is a constrained device, the first node 111 may, e.g., autonomously, or based on a request or query from the communication device 130, initiate the provision of location information to the communication device 130.

In preparation for the provision of location information to the communication device 130 which may eventually take place, in this Action 203, the first node 111 may create an object in the communication device 130 as a placeholder for the information on the location of the communication device 130. An object may be understood as, for example described in the Open Mobile Alliance LWM2M v 1.0 http://www.openmobilealliance.org/wp/OMNA/LwM2M/LwM2M-Registry.html. The creating 203 may be based on the communication device 130 being identified by the first node 111 as a constrained communication device 130 lacking a capability to query the second node 112. That is, the identification of the communication device 130 as a constrained communication device may trigger the creation of the object in the communication device 130, as the first node 111 may determine it is a communication device 130 lacking the capability to directly obtain the location information itself. For example, LWM2M clients, being lightweight may often not have a Global Positioning System (GPS) chip in order to spare some battery.

In some examples, the object may be, e.g., a "3GPP Location" object. Particularly, in some examples herein, the object may be understood as a new LWM2M Object that may partially map to the "LocationInfo" Data type defined in 3GPP TS 29.122. Such object may be used when other means of location, e.g., GPS, may not be available on the device.

Action 204

Having the communication device 130 been identified by the first node 111 as a constrained communication device 130 lacking the capability to query the second node 112, the first node 111, in this Action 204, sends a query to the second node 112 operating in the communications network 10. The query requests information on a location of the communication device 130 operating in the communications network 10.

The second node 112 may be able to provide a rough location of the communication device 130, by for example, deriving it by triangulating the position of the communication device 130, taken, e.g., from a modem in the communication device 130, with neighboring radio nodes such as the radio network node 140.

The sending in this Action 204 may be performed over e.g., the first link 161. The queried information may be, for example, an elapsed time since a last contact of the communication device 130 with the telecommunications network 100, an identifier of the cell 150 where the communication device 130 is registered, an identifier of the radio network node 140 which is currently serving or in proximity of the communication device 130, an identifier of geographic information about the communication device 130, a latitude value, an identity of the area where the communication device 130 is located, a longitude value, an identifier of a routing area where the communication device 130 is located, an identifier of a service area the communication device 130 is located, an identifier of a tracking area where the communication device 130 is located, etc. . . . .

In some examples, the first node 111 may send the query to the second node 112, based on, e.g., triggered by, the first query received from the communication device 130. The query sent from the first node 111 to the second node 112 may then be considered a second query.

Action 205

The first node 111 may then, in this Action 205, obtain the information from the 20 second node 112, in response to the sent query. In examples wherein the second node 112 may operate a SCEF, the information may be obtained, in the form of "Notification Data". A particular example of the information that may be obtained will be provided later in FIG. 6.

The obtaining, e.g., receiving, in this Action 205 may be performed over e.g., the first link 161.

Action 206

The obtained information may be based on one or more first capabilities to process information of the first node 111 and the second node 112. That is, the information may be obtained by the first node 111 in a format that both the first node 111 and the second node 112 may support. For example, the one or more first capabilities to process information may be the support of the Domain Name System (DNS) protocol. Since the communication device 130 is a constrained device, with very limited resources, it may lack the one or more first capabilities to process information. For example, the communication device 130 may lack support of the DNS protocol. The communication device 130 may instead have one or more second capabilities to process information. For example, the one or more second capabilities to process information may be the support of the Constrained Application Protocol (CoAP) protocol. Therefore, in this Action 206, the first node 111 may adapt the obtained information to the one or more second capabilities to process information of the communication device 130, rendering the adapted obtained information compatible with the one or more second capabilities to process the information of the communication device 130. That is, the obtained information may be adapted into a format that both the first node 111 and the communication device 130 may support.

The adapting in this Action 206 may comprise, for example, modifying a format in which the information may have been obtained from the second node 112, e.g., JavaScript Object Notation (JSON), and which the communication device 130 may not be able to process, into another format the communication device 130 may be able to process, such as, e.g., Sensor Markup Language (SENML), Concise Binary Object Representation (CBOR), or JSON, in cases the information is obtained in a format other than JSON.

Action 207

The first node 111 may then, in this Action 207, initiate updating the object in the communication device 130 based on the obtained information. The object may be understood to be the created object in Action 202. Updating may be understood as writing the obtained information in the object. The format of the message payload may be SENML, CBOR or JSON. In other words, in this Action 207, the first node 111 may provide the location information to the communications device 130.

To initiate updating may be understood as to begin updating itself, or to trigger the updating by a different node, e.g., in a distributed node environment. The updating in this Action 207 may be performed over e.g., the second link 162.

In some embodiments, the adaption of the obtained information in Action 206 may have been performed prior to the initiating updating of the object in this Action 207. In such embodiments wherein Action 206 may have been performed, the object may be updated, in this Action 207, with the adapted information, thereby enabling the communication device 130 to process the updated information.

Action 208

In some embodiments, the first node 111 may have set the subscription in Action 202 prior to the initiating updating of the object in Action 207. The first node 111 may at some subsequent time point, obtain, in this Action 208, from the second node 112 and based on the set subscription, additional information on the location of the communication device 130. This may occur, for example, after a change in the location of the communication device 130 may have been detected.

The obtaining, e.g., receiving, in this Action 208 may be performed over e.g., the first link 161.

Action 209

The first node 111 may then, in this Action 209, update the object in the communication device 130 based on the obtained additional information. As described before, the additional information may have been obtained according to the one or more first capabilities of the first node 111 and the second node 112, and therefore, the obtained additional information may be also processed according to the one or more second capabilities of the communication device 130.

The updating in this Action 207 may be performed over e.g., the second link 162.

In some embodiments, the obtained additional information comprises an indication of an age of the information on the location of the communication device 130. This may allow the estimation by the communication device 130 of its sleep and movement patterns.

Figure 3:
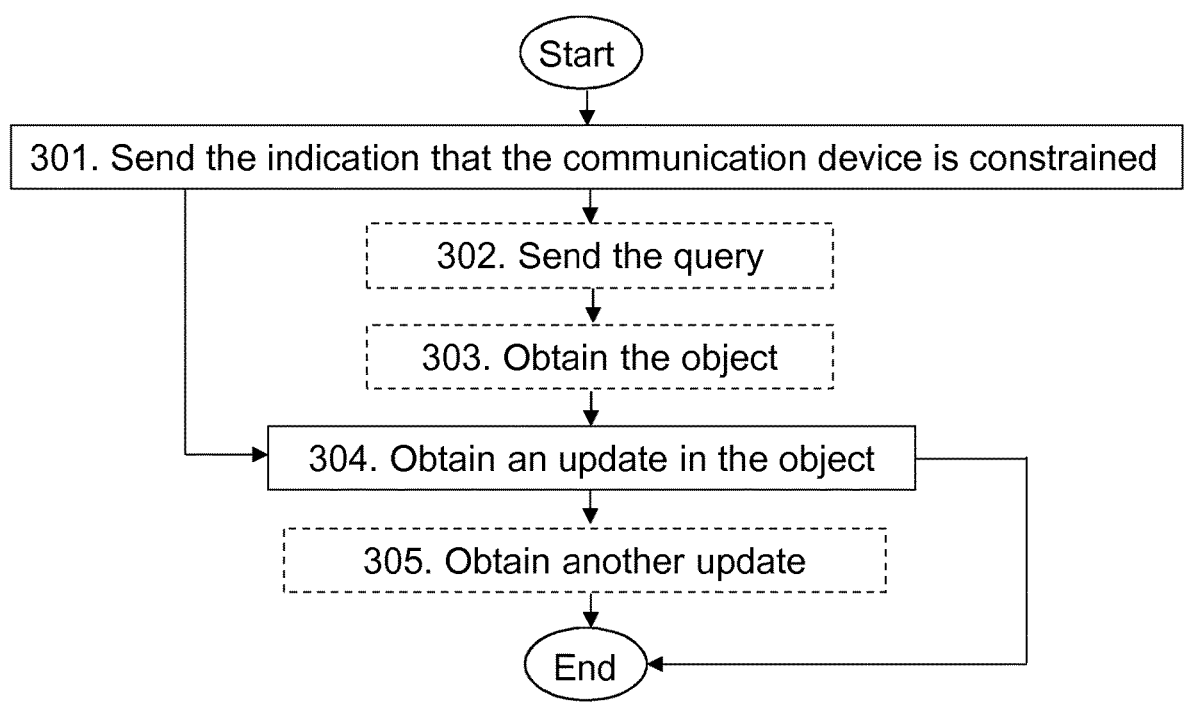
FIG. 3 is a flowchart depicting embodiments of a method in a communications device, according to embodiments herein.

Embodiments of a method performed by the communication device 130, will now be described with reference to the flowchart depicted in FIG. 3. The method may be understood to be for handling positioning information. The communication device 130 operates in the communications network 10. As mentioned earlier, in some embodiments, the communication device 130 is a constrained device. The communication device 130 may run a client application capable of requesting resources or services from a host application run by the first node 111.

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 3, optional actions are indicated with dashed boxes.

The detailed description of some of the following corresponds to the same references provided above, in relation to the actions described for the first node 111, and will thus not be repeated here to simplify the description. For example, the first node 111 may be a LWM2M server.

Action 301

In this Action 301, the communication device 130 sends, to the first node 111 operating in the communications network 10, the indication that the communication device 130 is a constrained communication device 130, which indication was described earlier. As also described earlier, in some examples, the communication device 130 may send the indication during the course of a Bootstrapping and Registration procedures, as e.g., specified by the OMA DM-LWM2M.

The sending in this Action 301 may be performed, e.g., via the second link 162.

Action 302

In some embodiments, the communication device 130 may, in this Action 302, send, to the first node 111, the query, that is, the first query, requesting the information on the location of the communication device 130.

The sending in this Action 302 may be performed, e.g., via the second link 162.

Action 303

The communication device 130 may then, in this Action 303, obtain, from the first node 111, the object in the communication device 130 as a placeholder for the information on the location of the communication device 130.

The obtaining, e.g., receiving, in this Action 303 may be performed over e.g., the 30 second link 162.

Action 304

In this Action 304, the communication device 130 obtains, from the first node 111 and based on to the sent indication in Action 301, the update in the object in the communication device 130. The update comprises the information on the location of the communication device 130. As explained earlier, the communication device 130 lacks the capability to query the second node 112 operating in the communications network 10 having access to the location information. The information in the obtained update originates in the second node 112. As stated earlier, in some embodiments, the second node 112 may operate a SCEF.

In some embodiments wherein the communication device 130 has sent the first query in Action 302, the obtained update in this Action 304 may be based on the sent query.

The obtaining, e.g., receiving, in this Action 304 may be performed over e.g., the 10 second link 162.

The update may be obtained according to the one or more second capabilities to process the information of the communication device 130.

In some embodiments, the obtained information may comprise the indication of the age of the information on the location of the communication device 130.

Action 305

In this Action 305, the communication device 130 obtains, from the first node 111, and based on the set subscription with the second node 112 for the communication device 130, the other update in the object in the communication device 130 with the additional information on the other location of the communication device 130. The additional information may originate from the second node 112.

The obtaining, e.g., receiving, in this Action 305 may be performed over e.g., the second link 162.

Figure 4:
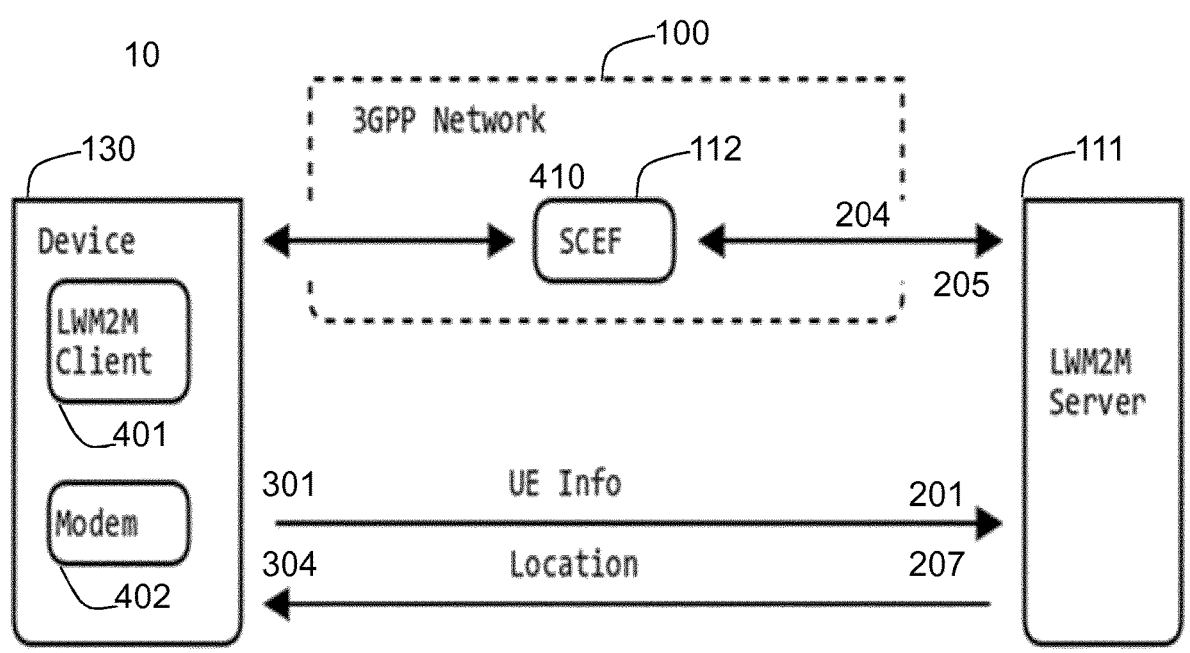
FIG. 4 is a flowchart depicting embodiments of a method in a communications network according to embodiments herein.

FIG. 4 is a schematic diagram illustrating a non-limiting example of the general topology of the communications network 10 wherein embodiments herein may be implemented. As a constrained device, the communication device 130 may be managed and provided with services through the LWM2M protocol. LWM2M uses a LWM2M server and client system. In the non-limiting example of FIG. 4, the first node 111 is an LWM2M Server running a host application, and the communication device 130 runs a LWM2M Client application 401. In FIG. 4, the communication device 130 denoted as "Device", is running LWM2M and is connected with a modem 402, e.g., a 3GPP type of modem, such as NB-IoT, LTE, GSM . . . , to the telecommunications network 100, which is in this example a 3GPP network. The telecommunications network 100 supports the 35 second node 112, which is here an SCEF. The telecommunications network 100 comprises also a Mobility Management Entity (MME) 400. As stated earlier, LWM2M clients, being lightweight, may often not have a GPS chip, in order to spare some battery. However the SCEF may take at 410, a rough location from the modem in the communication device 130 by triangulating the position with the base stations surrounding it. While the communication device 130 may lack an ability to directly obtain that position from the SCEF, the position may be accessible from the SCEF and may be sent to the communication device 130 via the LWM2M server. The communication device 130 may send the indication that it is a constrained device to the first node 111 at 301, as indicated by "UE Info" in the Figure. The first device 111 may receive the indication according to Action 201. The first node 111 may send the query to the second node 112 according to Action 204, and may then obtain the information from the second node 112, according to Action 205. The first node 111 may then send the location to the communication device 130 according to Action 207, which the communication device 130 obtains according to Action 304.

Figure 5:
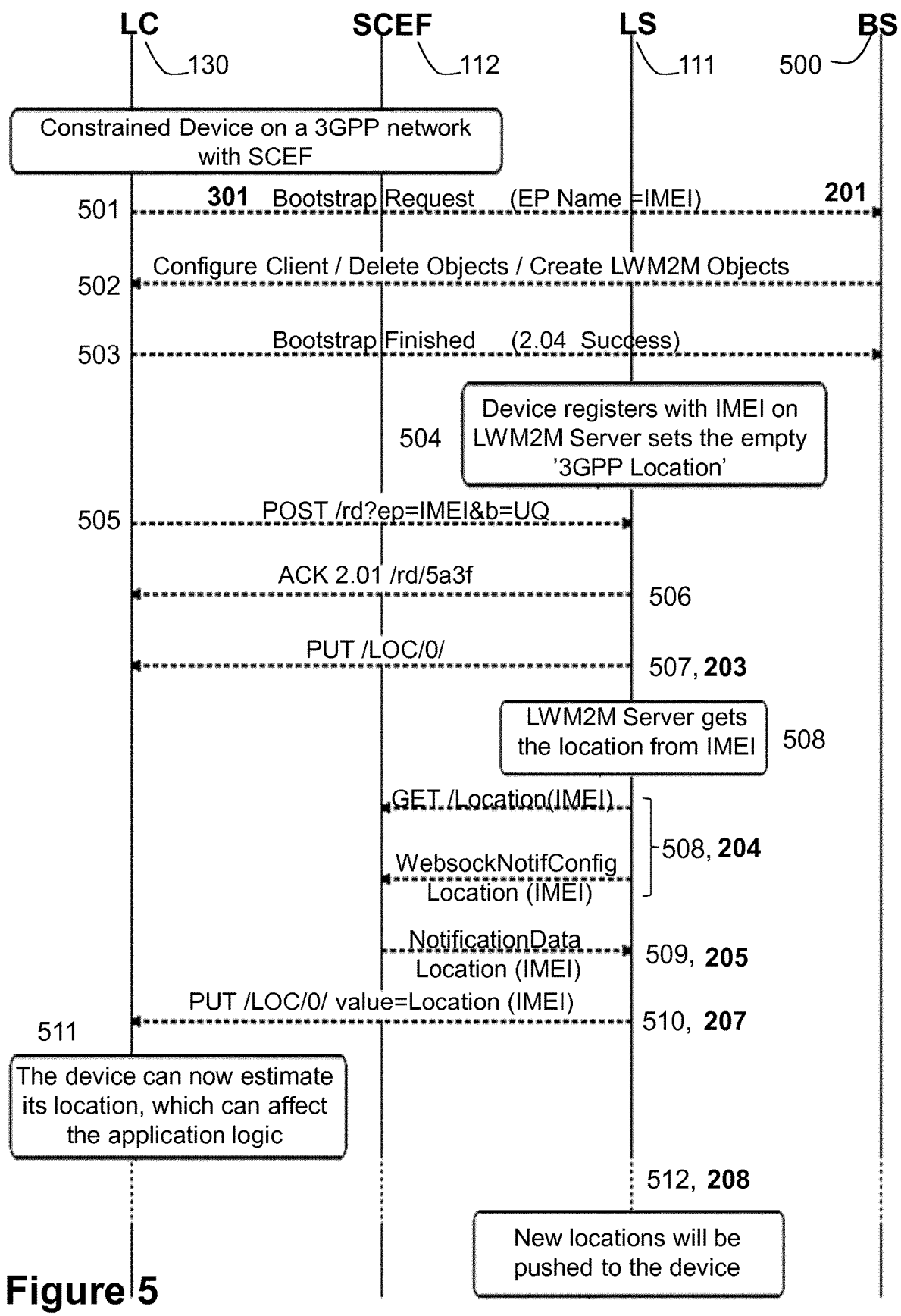
FIG. 5 is a flowchart depicting embodiments of a SCEF location object, according to embodiments herein.

The methods just described as being implemented by the first node 111 and the second node 112 will now be described in further detail next, in relation to FIG. 5, with a particular non-limiting example, wherein the general process of embodiments herein is tied to the LWM2M Device Management interface. New operations according to embodiments herein are indicated with the symbol "*". FIG. 5 is a schematic diagram illustrating a non-limiting example of the methods that may be performed by the first node 111, which is an LWM2M Server "LS", and CoAP Client, in the non-limiting example of FIG. 5, and the communication device 130, which is a LWM2M Client "LC" in the non-limiting example of FIG. 5. In the non-limiting example in FIG. 5, the LC is a constrained device on the telecommunication network 100, which is a 3GPP network comprising the second node 112, an SCEF in the non-limiting example of FIG. 5.

At 501 may start to perform a LWM2M Bootstrapping and Registration procedures as specified by the OMA DM-LWM2M. As part of these procedures, the communication device 130 sends, according to Action 301, the indication that the communication device 130 is a constrained communication device 130 in a Bootstrap Request. The Bootstrap Request targets a Bootstrap Server 500. The indication in this case is an End Point (EP) Name, which may be an IMEI. The LWM2M Bootstrapping and Registration procedures may also comprise, at 502, configuring the client, deleting objects and creating LM2M objects in order to initialize the device towards the management system. At 503, the Bootstrapping and Registration procedures are finished, as indicated by a 2.04 Success, which is a standard REST CoAP Response message when an operation is successful, as defined in RFC7252. At 504, the communication device 130 is then registered with its IMEI on the first node 111. The first node 111 then sets an empty "3GPP Location", wherein empty may be understood to mean that the communication device 130 will have no location until updated from the first node 111. At 505, the communication device 130 registers on the first node 111 with its IMEI. At 506, the first node 111 acknowledges that the communication device 130 is successfully registered, providing the registration handler. At 507*, in accordance with Action 203, the first node 111 creates an empty "Location Object" in the communication device 130 as a placeholder for the location fetched later on from the second node 112, that is, the SCEF. At 508*, the first node 111 uses the UE information, e.g., IMSI, IMEI, received during the registration to query the second node 112 over the T8 interface for getting the location information of the communication device 130, in accordance with Action 204. The first node 111 sets a WebsockNotifConfig for that information, to get notified for the delivery of notifications over Websockets for the IMEI of the communication device 130. At 509*, the notification arrives from the second node 112 in the form of "Notification Data", in accordance with Action 205, and based on the IMEI. At 510*, the first node 111 uses the location information from the second node 112 to update the "Location Object" for the communication device 130, in accordance with Action 207, and based on the IMEI. The updating is performed via a "PUT" action. At 511, the communication device 130 logic may now change depending on the location, i.e., actuate only in this area take measurements on that area, etc, independent from GPS. At 512*, the first node 111 writes the new object on the communication device 130, applications using LWM2M, or CoAP, and may now be able to use location information directly from the communication device 130. At 512*, whenever a new notification comes from the second node 112, the first node 111 acts as a proxy towards the communication device 130 and, in accordance with Action 208, update it accordingly.

FIG. 6 is a schematic diagram illustrating a particular non-limiting example of the information on the location of the communication device 130 that may be obtained by the first node 111 from the second node 112, as provided by different indicators. As depicted in the figure, the information may comprise: an elapsed time since a last network contact of the communication device 130, indicated by an "ageOLocationInfo" value; a Cell Global Identification identifying a cell where the communication device 130 is registered, indicated by a "Cell ID" value; an eNodeB in which the communication device 130 is currently located, indicated by a "enodeBId" value; an identifier of geographic information about the communication device 130, indicated by a "geographicArea" value, a latitude value, indicated by a "latitude" value; a Location Area Identity where the communication device 130 is located, indicated by a "locationAreaId" value; a longitude value, indicated by a "longitude" value; a Routing Area Identity where the communication device 130 is located, indicated by a "routingAreaId" value; a Service Area Identity where the communication device 130 is located, indicated by a "serviceAreaId" value; a Tracking Area Identity where the communication device 130 is located, indicated by a "trackingAreaId" value.

As a general summarized overview of the foregoing, embodiments herein may be understood to provide a mechanism for providing location to a device over LWM2M, when the network supports SCEF and may provide rough location settings.

Some embodiments herein, particularly, may be understood to provide a new LWM2M Object that partially maps to the "LocationInfo" Data type defined in 3GPP TS 29.122. Such object may be used when other means of location, e.g., GPS, are not available on the device. Embodiments herein may be understood to describe a simple REST API to interact with that Object in the SCEF, as well as the mechanism that may be required to interact with the device.

One advantage of embodiments herein is that they allow LWM2M to provide location services to devices, such as the communication device 130. A further advantage of embodiments herein is that they make use of standard 3GPP, OMA and Internet Engineering Task Force (IETF) protocols. Yet another advantage of embodiments herein is that they do not need new logic on devices, that is, further multiple stacks are not needed on the constrained device to obtain the location. Having access to the first node 111 may be understood to be enough. Another advantage of embodiments herein is that, although accuracy may vary, they enable to pinpoint the location of a device to the closest eNodeB. A further advantage of embodiments herein is that they also enable to provide the age of the location information, allowing to estimate sleep and movement patterns of the communication device 130, which may then be used to better integrate the network on the application software systems of the communication device 130. For example, it may be used to learn about the interactions of the communication device 130 with the environment, when it is connected, when it is off and where it is normally geographically located.

FIG. 7 depicts two different examples in panels a) and b), respectively, of the arrangement that the first node 111 may comprise to perform the method actions described above in relation to FIG. 2. The first node 111 is configured to operate in the communications network 10.

The detailed description of some of the following corresponds to the same references provided above, in relation to the actions described for the first node 111, and will thus not be repeated here. For example, the first node 111 may be an LWM2M server. In FIG. 7, optional units are indicated with dashed boxes.

In some embodiments, the first node 111 may comprise the following arrangement depicted in FIG. 7a.

The first node 111 is configured to, e.g. by means of a sending unit 701 within the first node 111 configured to, send the query to the second node 112 configured to operate in the communications network 10. The query is configured to request the information on the location of the communication device 130 configured to operate in the communications network 10. The communication device 130 is configured to be identified by the first node 111 as a constrained communication device 130 lacking the capability to query the second node 112.

As described earlier, in some embodiments, the second node 112 is configured to operate an SCEF.

In some embodiments, the communication device 130 may be a constrained device configured to operate on LWM2M.

The first node 111 is also configured to, e.g. by means of an obtaining unit 702 within the first node 111 configured to, obtain the information from the second node 112, in response to the query configured to be sent.

In some embodiments, the first node 111 is further configured to, e.g. by means of an initiating unit 703 within the first node 111 configured to, initiate updating the object in the communication device 130 based on the information configured to be obtained.

In some embodiments, the first node 111 may be configured to, e.g. by means of a creating unit 704 within the first node 111 configured to, create the object in the communication device 130 as the placeholder for the information on the location of the communication device 130. To create may be configured to be based on the communication device 130 being identified by the first node 111 as a constrained communication device 130 lacking the capability to query the second node 112.

In some embodiments, the information configured to be obtained may be configured to be based on the one or more first capabilities to process information of the first node 111 and the second node 112. In such embodiments, the first node 111 may be further configured to, prior to the updating of the object, e.g. by means of an adapting unit 705 within the first node 111 configured to, adapt the information configured to be obtained to the one or more second capabilities to process information of the communication device 130, and render the information configured to be obtained and adapted compatible with the one or more second capabilities to process the information of the communication device 130. In some of such embodiments, the object may be further configured to be updated with the information configured to be adapted.

In some embodiments, the first node 111 may be further configured to, e.g. by means of the obtaining unit 702 within the first node 111 configured to, obtain, from the communication device 130, the indication that the communication device 130 is a constrained communication device 130.

In some embodiments, the first node 111 may be further configured to, e.g. by means of a setting unit 706 within the first node 111 configured to, set, prior to the updating of the object, the subscription with the second node 112 for the communication device 130.

In some embodiments, the first node 111 may be further configured to, e.g. by means of the obtaining unit 702 within the first node 111 configured to, obtain, from the second node 112 and based on the set subscription, the additional information on the location of the communication device 130.

In some embodiments, the first node 111 may be further configured to, e.g. by means of an updating unit 707 within the first node 111 configured to, update the object in the communication device 130 based on the obtained additional information. The obtained additional information may be configured to be processed according to the one or more second capabilities of the communication device 130.

The additional information configured to be obtained may comprise the indication of the age of the information on the location of the communication device 130.

The embodiments herein may be implemented through one or more processors, such as a processor 708 in the first node 111 depicted in FIG. 7a, together with computer program code for performing the functions and actions of the embodiments herein. The processor 708 may be understood herein to be a hardware component. The program code mentioned above may also be provided as a computer program product, for instance in the form of a data carrier carrying computer program code for performing the embodiments herein when being loaded into the in the first node 111. It is however feasible with other data carriers such as a memory stick. The computer program code may furthermore be provided as pure program code on a server and downloaded to the first node 111.

The first node 111 may further comprise a memory 709 comprising one or more memory units. The memory 709 is arranged to be used to store obtained information, store data, configurations, schedulings, and applications etc. to perform the methods herein when being executed in the first node 111.

In some embodiments, the first node 111 may receive information from, e.g., the second node 112 and the communication device 130, through a receiving port 710. In some examples, the receiving port 710 may be, for example, connected to one or more antennas in first node 111. In other embodiments, the first node 111 may receive information from another structure in the communications network 10 through the receiving port 710. Since the receiving port 710 may be in communication with the processor 708, the receiving port 710 may then send the received information to the processor 708. The receiving port 710 may also be configured to receive other information.

The processor 708 in the first node 111 may be further configured to transmit or send information to e.g., the second node 112 and the communication device 130, through a sending port 711, which may be in communication with the processor 708, and the memory 709.

Any of the sending unit 701, the obtaining unit 702, the initiating unit 703, the creating unit 704, the adapting unit 705, the setting unit 706 and the updating unit 707 may be the processor 708 of the first node 111, or an application running on such processor.

Those skilled in the art will also appreciate that the sending unit 701, the obtaining unit 702, the initiating unit 703, the creating unit 704, the adapting unit 705, the setting unit 706 and the updating unit 707 described above may refer to a combination of analog and digital circuits, and/or one or more processors configured with software and/or firmware, e.g., stored in memory, that, when executed by the one or more processors such as the processor 708, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the first node 111 may be respectively implemented by means of a computer program 712 product, comprising instructions, i.e., software code portions, which, when executed on at least one processor 708, cause the at least one processor 708 to carry out the actions described herein, as performed by the first node 111. The computer program 712 product may be stored on a computer-readable storage medium 713. The computer-readable storage medium 713, having stored thereon the computer program 712, may comprise instructions which, when executed on at least one processor 708, cause the at least one processor 708 to carry out the actions described herein, as performed by the first node 111. In some embodiments, the computer-readable storage medium 713 may be a non-transitory computer-readable storage medium, such as memory stick, or stored in the cloud space. In other embodiments, the computer program 712 product may be stored on a carrier containing the computer program, wherein the carrier is one of an electronic signal, optical signal, radio signal, or the computer-readable storage medium 713, as described above.

The first node 111 may comprise an interface unit to facilitate communications between the first node 111 and other nodes or devices, e.g., the second node 112. In some particular examples, the interface may, for example, include a transceiver configured to transmit and receive radio signals over an air interface in accordance with a suitable standard.

In other embodiments, the first node 111 may comprise the following arrangement depicted in FIG. 7b. The first node 111 may comprise a processing circuitry 708, e.g., one or more processors such as the processor 708, in the first node 111 and the memory 709. The first node 111 may also comprise a radio circuitry 714, which may comprise e.g., the receiving port 710 and the sending port 711. The processing circuitry 708 may be configured to, or operable to, perform the method actions according to FIG. 2 and/or FIG. 5, in a similar manner as that described in relation to FIG. 7a. The radio circuitry 714 may be configured to set up and maintain at least a wireless connection with the communication device 130. Circuitry may be understood herein as a hardware component.

Hence, embodiments herein also relate to the first node 111 operative to operate in the communications network 10. The first node 111 may comprise the processing circuitry 708 and the memory 709, said memory 709 containing instructions executable by said processing circuitry 708, whereby the first node 111 is further operative to perform the actions described herein in relation to the first node 111, e.g., in FIG. 2 and/or FIG. 5.

FIG. 8 depicts two different examples in panels a) and b), respectively, of the arrangement that the communication device 130 may comprise to perform the method actions described above in relation to FIG. 3. The communication device 130 is configured to operate in the communications network 10. The communication device 130 is a constrained communication device 130. In FIG. 8, optional units are indicated with dashed boxes.

In some embodiments, the communication device 130 may comprise the following arrangement depicted in FIG. 8a.

The detailed description of some of the following corresponds to the same references provided above, in relation to the actions described for the communication device 130, and will thus not be repeated here. For example, the communication device 130 may be a constrained device configured to operate on LWM2M.

The communication device 130 is configured to, e.g. by means of a sending unit 801 within the communication device 130 configured to, send, to the first node 111 configured to operate in the communications network 10, the indication that the communication device 130 is a constrained communication device 130.

The communication device 130 is also configured to, e.g. by means of an obtaining unit 802 within the communication device 130 configured to, obtain, from the first node 111 and based on to the indication configured to be sent, the update in the object in the communication device 130. The update is configured to comprise the information on the location of the communication device 130. The communication device 130 lacks the capability to query the second node 112 configured to operate in the communications network 10 and configured to have access to the location information. The information in the update configured to be obtained is configured to originate in the second node 112.

In some embodiments, the first node 111 may be an LWM2M server.

The second node 112 may be configured to operate a SCEF.

In some embodiments, the communication device 130 may be configured to, e.g. by means of the sending unit 801 within the communication device 130 configured to, send, to the first node 111, the query requesting the information on the location of the communication device 130. The update configured to be obtained may be configured to be based on the sent query.

In some embodiments, the communication device 130 may be configured to, e.g. by means of the obtaining unit 802 within the communication device 130 configured to, obtain, from the first node 111, the object in the communication device 130 as the placeholder for the information on the location of the communication device 130.

The update may be configured to be obtained according to the one or more second capabilities to process the information of the communication device 130.

In some embodiments, the communication device 130 may be configured to, e.g. by means of the obtaining unit 802 within the communication device 130 configured to, obtain, from the first node 111 and based on the subscription for the communication device 130 configured to be set with the second node 112, the other update in the object in the communication device 130 with the additional information on the other location of the communication device 130. The additional information is configured to originate from the second node 112.

The information configured to be obtained may be configured to comprise the indication of the age of the information on the location of the communication device 130.

The embodiments herein may be implemented through one or more processors, such as a processor 803 in the communication device 130 depicted in FIG. 8, together with computer program code for performing the functions and actions of the embodiments herein. The processor 803 may be understood herein to be a hardware component. The program code mentioned above may also be provided as a computer program product, for instance in the form of a data carrier carrying computer program code for performing the embodiments herein when being loaded into the in the communication device 130. One such carrier may be the cloud 120. It is however feasible with other data carriers such as a memory stick. The computer program code may furthermore be provided as pure program code on a server and downloaded to the communication device 130.

The communication device 130 may further comprise a memory 804 comprising one or more memory units. The memory 804 is arranged to be used to store obtained information, store data, configurations, schedulings, and applications etc. to perform the methods herein when being executed in the communication device 130.

In some embodiments, the communication device 130 may receive information from, e.g., the first node 111, through a receiving port 805. In some examples, the receiving port 805 may be, for example, connected to one or more antennas in the communication device 130. In other embodiments, the communication device 130 may receive information from another structure in the communications network 10 through the receiving port 805. Since the receiving port 805 may be in communication with the processor 803, the receiving port 805 may then send the received information to the processor 803. The receiving port 805 may also be configured to receive other information.

The processor 803 in the communication device 130 may be further configured to transmit or send information to e.g., the first node 111, through a sending port 806, which may be in communication with the processor 803, and the memory 804.

Any of the sending unit 801 and the obtaining unit 802 may be the processor 803 of the first node 111, or an application running on such processor.

Those skilled in the art will also appreciate that the sending unit 801 and the obtaining unit 802 described above may refer to a combination of analog and digital circuits, and/or one or more processors configured with software and/or firmware, e.g., stored in memory, that, when executed by the one or more processors such as the processor 803, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the communication device 130 may be respectively implemented by means of a computer program 807 product, comprising instructions, i.e., software code portions, which, when executed on at least one processor 803, cause the at least one processor 803 to carry out the actions described herein, as performed by the communication device 130. The computer program 807 product may be stored on a computer-readable storage medium 808. The computer-readable storage medium 808, having stored thereon the computer program 807, may comprise instructions which, when executed on at least one processor 803, cause the, at least, one processor 803 to carry out the actions described herein, as performed by the communication device 130. In some embodiments, the computer-readable storage medium 808 may be a non-transitory computer-readable storage medium, such as a memory stick, or stored in the cloud space. In other embodiments, the computer program 807 product may be stored on a carrier containing the computer program, wherein the carrier is one of an electronic signal, optical signal, radio signal, or the computer-readable storage medium 808, as described above.

The communication device 130 may comprise an interface unit to facilitate communications between the communication device 130 and other nodes or devices, e.g., the first node 111. In some particular examples, the interface may, for example, include a transceiver configured to transmit and receive radio signals over an air interface in accordance with a suitable standard.

In other embodiments, the communication device 130 may comprise the following arrangement depicted in FIG. 8*b*. The communication device 130 may comprise a processing circuitry 803, e.g., one or more processors such as the processor 803, in the communication device 130 and the memory 804. The communication device 130 may also comprise a radio circuitry 809, which may comprise e.g., the receiving port 805 and the sending port 806. The processing circuitry 803 may be configured to, or operable to, perform the method actions according to FIG. 3 and/or FIG. 5, in a similar manner as that described in relation to FIG. 8*a*. The radio circuitry 809 may be configured to set up and maintain at least a wireless connection with the first node 111. Circuitry may be understood herein as a hardware component.

Hence, embodiments herein also relate to the communication device 130 operative to operate in the communications network 10. The communication device 130 may comprise the processing circuitry 803 and the memory 804, said memory 804 containing instructions executable by said processing circuitry 803, whereby the communication device 130 is further operative to perform the actions described herein in relation to the communication device 130, e.g., in FIG. 3 and/or FIG. 5.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

REFERENCES

1. SCEF T8 Specification, 3GPP TS 29.122, V0.54.0 http://ftp.3gpp.org//Specs/archive/29_series/29.122/29122-050.zip.
2. RFC7252.
3. LWM2M (http://www.openmobilealliance.org/release/LightweightM2M/V1_0_1-20170704-A/OMA-TS-LightweightM2M-V1_0_1-20170704-A.pdf).

The invention claimed is:

1. A method performed by a first node operating in a communications network, the method comprising the first node:
   sending a query to a second node operating in the communications network, the query requesting location information on a location of a communication device operating in the communications network, wherein the communication device is identified by the first node as a constrained communication device lacking a capability to query the second node;
   obtaining the location information from the second node, in response to the sent query;
   creating an empty location object in the communication device as a placeholder for the location information, wherein the creating is based on the communication device being identified by the first node as a constrained communication device lacking a capability to query the second node; and
   initiating updating the location object in the communication device based on the obtained location information.

2. The method of claim 1, wherein the first node is a LightWeight Machine to Machine Protocol (LWM2M) server.

3. The method of claim 1, wherein the second node operates a Service Capability Exposure Function (SCEF).

4. The method of claim 1, wherein the communication device is a constrained device operating on LightWeight Machine to Machine Protocol (LWM2M).

5. The method of claim 1:
   wherein the obtained location information is based on one or more first capabilities to process information of the first node and the second node; and
   wherein the method further comprises, prior to updating of the location object, adapting the obtained information to one or more second capabilities to process information of the communication device, rendering the adapted obtained information compatible with the one or more second capabilities to process the information of the communication device; and
   wherein the location object is updated with the adapted information.

6. The method of claim 1, further comprising obtaining, from the communication device, an indication that the communication device is a constrained communication device.

7. The method of claim 5, further comprising:
   setting, prior to the updating of the location object, a subscription with the second node for the communication device;
   obtaining, from the second node and based on the set subscription, additional location information on the location of the communication device; and
   updating the location object in the communication device based on the obtained additional location information, wherein the obtained additional location information is processed according to one or more second capabilities of the communication device.

8. The method of claim 1, wherein the obtained additional location information comprises an indication of an age of the location information on the location of the communication device.

9. A method performed by a communication device operating in a communications network, the communication device being a constrained communication device, the method comprising the communication device:
   sending, to a first node operating in the communications network, an indication that the communication device is a constrained communication device; and
   obtaining, from the first node, an empty location object as a placeholder for the location information, wherein the empty location object is obtained based on the communication device being identified by the first node as a constrained communication device lacking a capability to query the second node;

obtaining, from the first node and based on to the sent indication, an update in the location object in the communication device, the update comprising location information on a location of the communication device; wherein the communication device lacks a capability to query a second node operating in the communications network having access to the location information; and wherein the location information in the obtained update originated in the second node.

10. The method of claim 9, wherein the first node is a LightWeight Machine to Machine Protocol (LWM2M) server.

11. The method of claim 9, wherein the second node operates a Service Capability Exposure Function, SCEF.

12. The method of claim 9, wherein the communication device is a constrained device operating on LightWeight Machine to Machine Protocol (LWM2M).

13. The method of claim 9, further comprising sending, to the first node, a query requesting the location information on the location of the communication device; wherein the obtained update is based on the sent query.

14. The method of claim 9, wherein the update is obtained according to one or more second capabilities to process the location information of the communication device.

15. The method of claim 9, further comprising obtaining, from the first node and based on a set subscription with the second node for the communication device, another update in the location object in the communication device with additional location information on another location of the communication device; the additional location information originating from the second node.

16. The method of claim 9, wherein the obtained location information comprises an indication of an age of the location information on the location of the communication device.

17. A first node configured to operate in a communications network, the first node comprising:
processing circuitry;
memory containing instructions executable by the processing circuitry whereby the first node is operative to:
send a query to a second node configured to operate in the communications network, the query being configured to request location information on a location of a communication device configured to operate in the communications network; wherein the communication device is configured to be identified by the first node as a constrained communication device lacking a capability to query the second node;
obtain the location information from the second node, in response to the sent query;
create an empty location object in the communication device as a placeholder for the location information, wherein the creating is based on the communication device being identified by the first node as a constrained communication device lacking a capability to query the second node; and
initiate updating the location object in the communication device based on the obtained location information.

18. A communication device configured to operate in a communications network, the communication device being a constrained communication device, the communication device being further configured to:
processing circuitry;
memory containing instructions executable by the processing circuitry whereby the communication device is operative to:
send, to a first node configured to operate in the communications network, an indication that the communication device is a constrained communication device; and
obtain, from the first node, an empty location object as a placeholder for the location information, wherein the empty location object is obtained based on the communication device being identified by the first node as a constrained communication device lacking a capability to query the second node;
obtain, from the first node and based on to the indication configured to be sent, an update in the location object in the communication device, the update comprising location information on a location of the communication device; wherein the communication device lacks a capability to query a second node configured to operate in the communications network and configured to have access to the location information; and
wherein the location information in the obtained update originated in the second node.

* * * * *